United States Patent Office 3,169,502
Patented Feb. 16, 1965

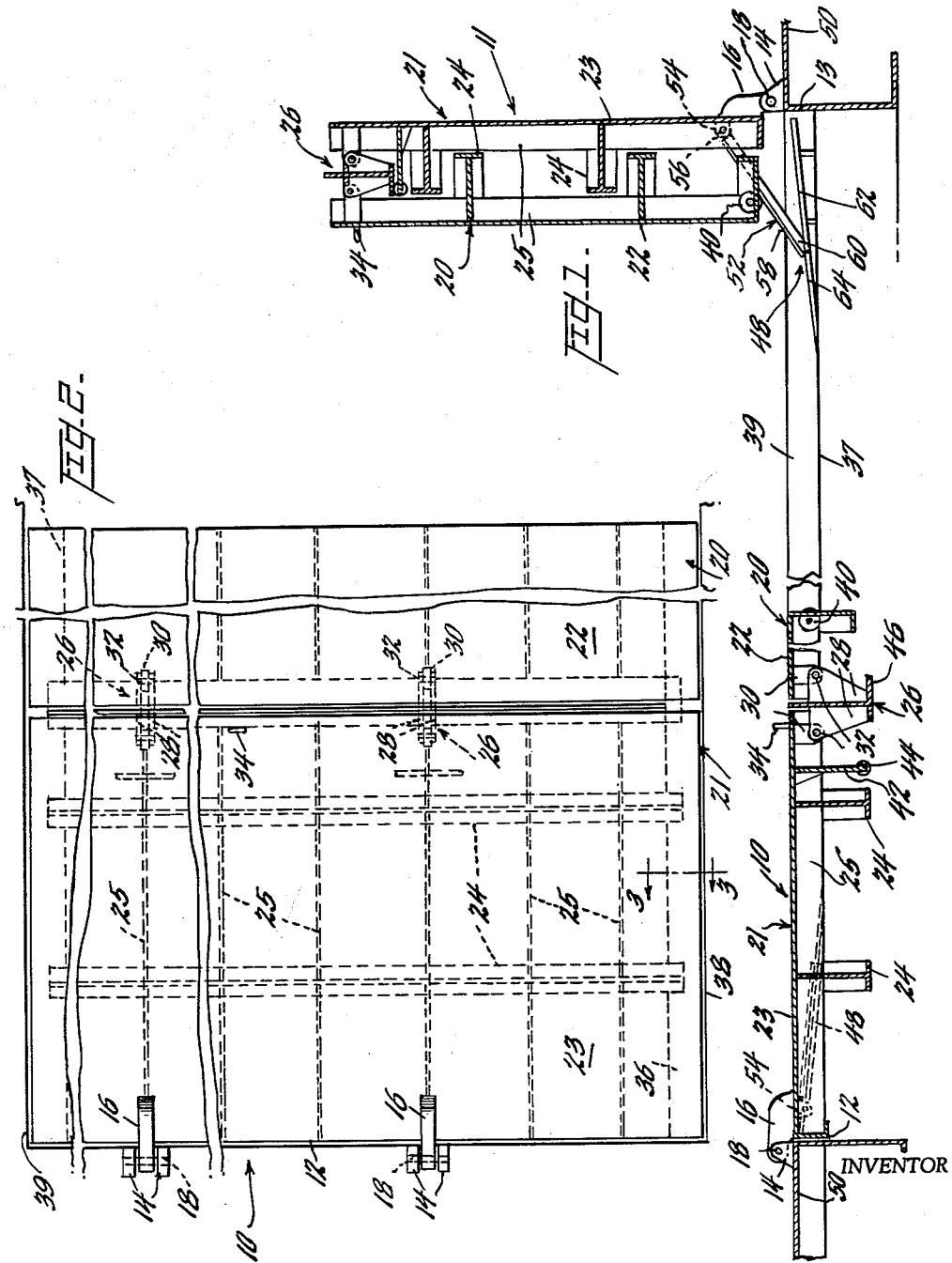
Feb. 16, 1965  E. GROPPELL  3,169,502
HATCH COVER ARRANGEMENT
Filed Oct. 4, 1963  3 Sheets-Sheet 1
INVENTOR
Eugene Groppell,
BY
ATTORNEYS

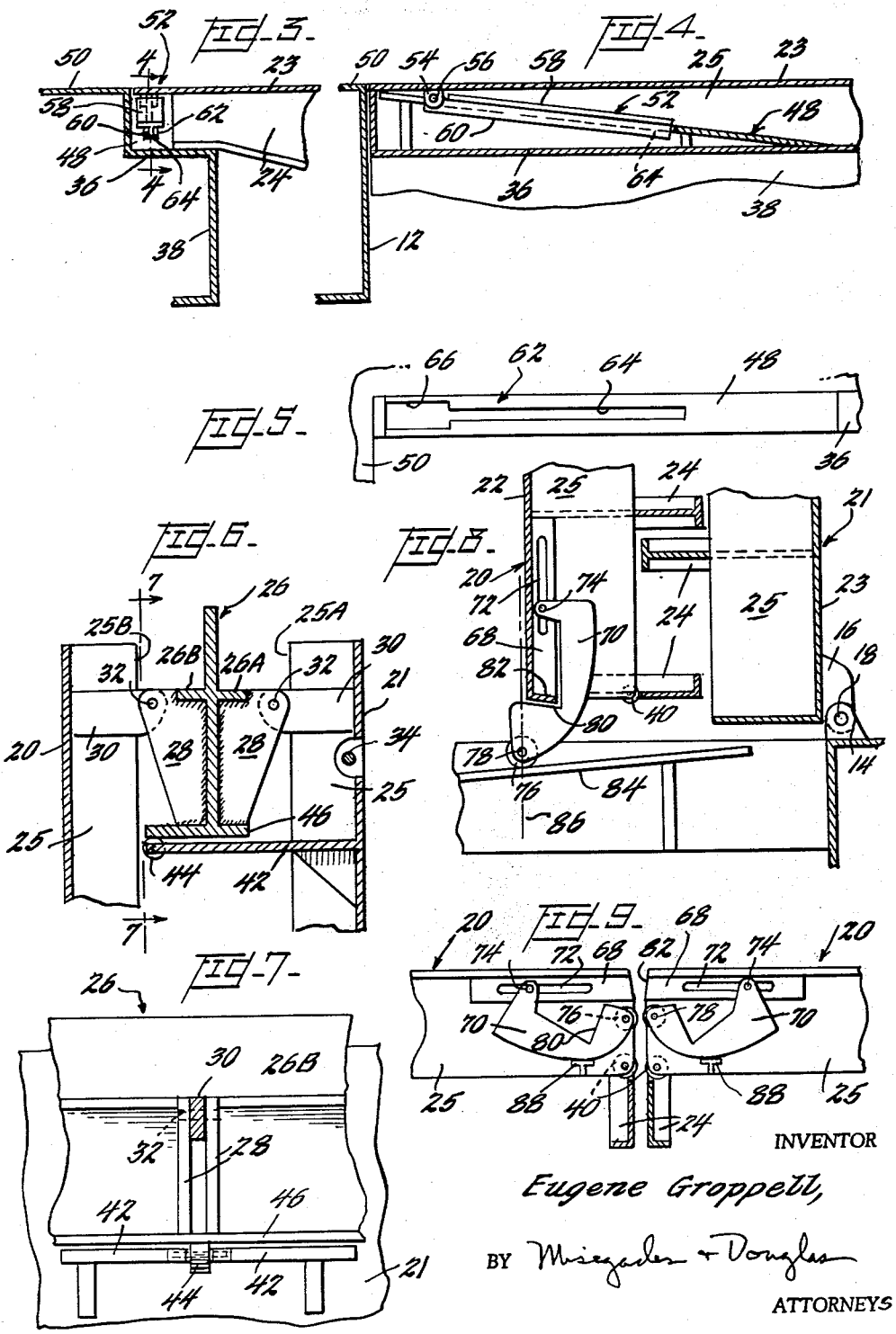

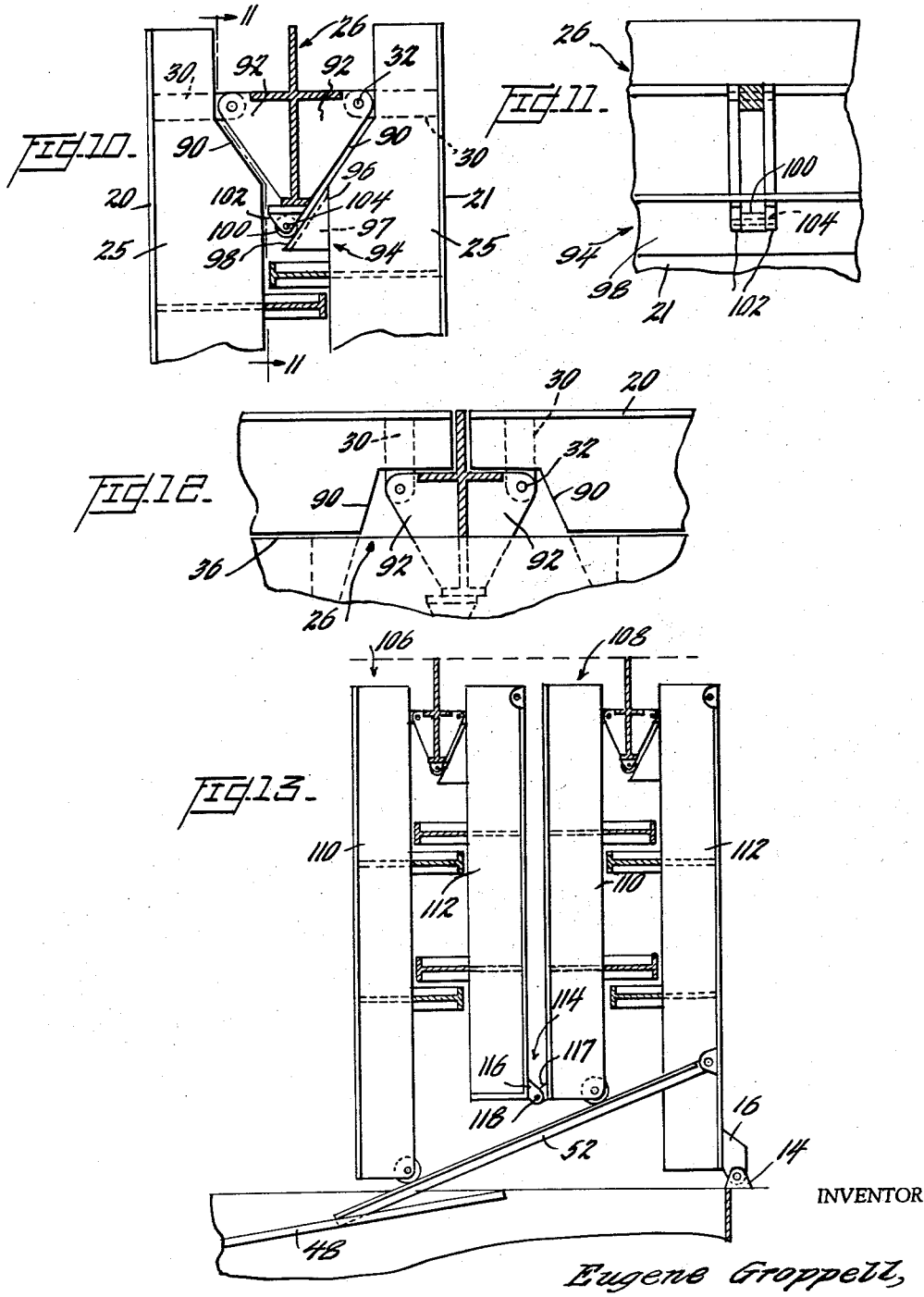

1

3,169,502
HATCH COVER ARRANGEMENT
Eugene Groppell, % 600 Godchaux Bldg., 527 Canal St., New Orleans, La.
Filed Oct. 4, 1963, Ser. No. 313,988
10 Claims. (Cl. 114—202)

This invention relates to ships and more specifically to an improved hatch cover arrangement for a cargo vessel.

Cargo vessels, as compared to other vessels that transport principally persons, animals, liquids or bulk cargo such as ore and coal, present special problems as they must be adapted to handle cargo of greatly varying dimensions and weight. Most modern cargo vessels have several decks used for the transport of freight which are provided with hatchways therein for access to lower holds in the ship. It is of utmost importance that these lower decks, or "tween" decks as they are commonly called, be provided with hatch openings of sufficient size to accommodate large bulky articles and have hatch covers strong enough to support heavy cargo. Furthermore, it is a primary concern to have hatch covers for these hatch openings that can be quickly and easily opened and closed while being of sufficient strength to support any heavy load placed upon them when closed.

Most cargo vessels today employ a lower deck hatch cover consisting of two separate sections each hingedly mounted to opposite sides of a hatchway, each section consisting of two panels hingedly mounted together. These sections are usually opened by employing the cargo lift ordinarily provided on such a vessel, or any other convenient hoisting apparatus as, for instance, the one located on a nearby dock during loading or unloading of such a vessel. The hatch covers are further provided with suitable rollers to assist the covers to close by force of gravity.

One such hatch cover arrangement is described in my Patent No. 2,484,286, issued October 11, 1949. However, some significant problems have arisen from this type of arrangement. The first concerns the lack of all the desired structural strength at the previously mentioned hinge point between the inner and outer panels of one section of a hatch cover. A second closely related problem concerns the tendency of the inner and outer panels to jam together occasionally when the closing operation is initiated.

Accordingly, it is a principal object of this invention to provide additional structural strength at the hinge point between the inner and outer panels of a section of a hatch cover.

Another object is to provide positive means to prevent jamming together of the panels of a hatch cover when a closing operation is initiated.

Yet another object is to provide improved roller means at opposite outer edges of an outer panel of a hatch cover that will prevent jamming of a hatch cover when being closed and will fall away and be enclosed in the deck when the closing operation is completed.

These and other objects of the invention will become apparent by reference to the following description of an embodiment of the invention and the attached drawings in which:

FIGURE 1 is a partial side elevational sectional view showing one hatch cover section closed and another in the open position;

FIGURE 2 is a partial plan view of one section of a hatch cover in the closed position;

FIGURE 3 is a sectional view taken on line 3—3 of FIGURE 2;

FIGURE 4 is a sectional view taken on line 4—4 of FIGURE 3;

FIGURE 5 is a partial plan view of FIGURE 4;

FIGURE 6 is an enlarged partial sectional view taken from the upper right hand side of FIGURE 1 showing the relationship of two panels of hatch cover section;

FIGURE 7 is a sectional view taken on line 7—7 of FIGURE 6;

FIGURE 8 is an enlarged partial sectional view taken from the lower right hand portion of FIGURE 1 showing another embodiment of an anti-jamming and roller mechanism;

FIGURE 9 is a side sectional view showing the mechanism of FIGURE 8 in the closed position together with a corresponding panel from the other hatch cover section;

FIGURE 10 is an enlarged partial section similar to FIGURE 6, but showing another embodiment of the relationship of the two panels;

FIGURE 11 is a section taken on the line 11—11 of FIGURE 10;

FIGURE 12 is an enlarged partial section showing the structure of FIGURE 10 with the panels closed; and FIGURE 13 is a partial side view illustrating the use of four panels in a hatch cover section.

Referring now to the drawings by character, and in particular to FIGURES 1 and 2, I have shown the aforementioned usual lower deck hatch cover arrangement consisting of a pair of hatch covers, 10 and 11, hingedly mounted to opposite sides 12 and 13 respectively, of a lower deck hatchway. Each hinge consists of a pair of ears 14 mounted to the deck coacting with a single plate 16 secured to the hatch cover. A pin 18 connects each pair of ears to each plate.

Each hatch cover consists of two sections, inner panel 20 and outer panel 21. Panels 20 and 21 are of the usual construction, consisting of top plate portions 22 and 23 supported by transverse longitudinal beams 24. As shown in FIGURES 1, 2 and 6, further support may be had for this structure by employing a series of stiffening plates 25. Panels 20 and 21 are hingedly connected together by a novel means consisting of "king" beam 26 with at least two pairs of hinge elements mounted thereto, each hinge element consisting of two plates 28 coacting with an ear 30 mounted in a panel 20 or 21. A pin 32 secures plates 28 to ear 30.

To open the hatch covers for access to holds below, the usual lift (not shown) is employed in conjunction with conventional grip means 34 secured to either inner panel 20 or outer panel 21. The lift means employed may either be the cargo boom with appropriate fairleads normally found in cargo vessels or a dockside winch may be used if deemed more desirable. While hatch covers 10 and 11 are in the closed position, the opposite outer edges of beams 24 rest on coamings 36 and 37 mounted on opposite longitudinal sides 38 and 39 of the hatch opening. When the opening operation is initiated, beams 24 are lifted from coamings 36 and 37. Rollers 40 mounted in opposite outer, lower edges of each inner panel 20, preferably within stiffening plate 25, contact the surface of coamings 36 and 37, which act as trackways for the same, and prevent friction between the panels and coamings while supporting the inner panels as the hatch covers are opened.

While the hatch covers are being lifted to open or vertical position, there is a tendency for translational movement to begin between each inner and outer panel due to the double hinge point supplied by "king" beam 26. As shown best in FIGURES 6 and 7, a plate 42 with a roller 44 rotatably secured therein is provided beneath each outer panel 21 in close proximity to each pair of plates 28. In the initial stage of an opening operation, translational movement between each inner and outer panel is prohibited by projections 26A and 25B of "king" beam 26 which are in contact with portions 25A and 25B of stiffener plates 25. When the opening operation is approximately thirty percent completed, roller 44 contacts the bottom plate portion 46 of "king" beam 26 thereby allowing plate 42 to provide support for "king" beam 26 while the rest of the opening operation is completed. Beams 24 are so arranged as to intermesh when the hatch cover is open, thus allowing the maximum possible opening for accessibility to the lower holds. Any convenient locking mechanism may be used to hold the panels in an open position, such as that described in my Patent No. 2,484,286. After locking, the fairleads may be released from grips 34.

To initiate a closing operation, fairleads from the previously mentioned lift means are secured to grip means 34 and the locking means described above are released. The force of gravity is employed to initiate the closing operation by use of inclines 48 which are mounted at opposite outer ends of coamings 38 and 39. Two pairs of inclines 48 used above are well known in the art, but due to the fact that the distance between coamings 36 and 37 and the level of deck 50 is necessarily limited, incline 48 cannot be placed at a great enough angle to prevent jamming together of panels 20 and 21 when the closing operation is initiated by force of gravity. To overcome this problem, bar 52, of T-shaped cross section pivotedly mounted on plates 23 by a pair of ears 54 and pin 56, is provided. The top 58 of bar 52 serves as an initial trackway for roller 40 when the closing operation is initiated. Further bar 52 has a lower web 60 which is slidably engageable with narrow portion 64 of slot 62 cut into incline 48. When the closing operation is partially completed, the lower end of incline 48 serves as a trackway for rollers 40 and finally coaming ledges 36 and 37 are used for this purpose. As shown in FIGURES 3, 4 and 5, the anti-jamming apparatus described above neatly folds into a compact position when the closing operation has been completed. Specifically, the upper or inner portion 66 of slot 62 is of such dimension to receive ears 54 attached to plate 23 while web 60 of T-bar 52 fits neatly into slot portion 64.

Another embodiment of an anti-jamming mechanism is shown in FIGURES 8 and 9 wherein a pair of slotted plates 68 are mounted at each outer end of panels 20. A generally U-shaped member 70 is pivotly mounted in slot 72 of plates 68 by a pin 74. Member 70 is further provided with a roller 76 rotatably mounted therein by pin 78. As shown in FIGURE 8, the sloped inner face 80 of the arm of member plate 70 rests against the slanted portion 82 of plate 68 thereby supporting said panel when in the open position. Roller 76 rests upon an incline 84, said incline serving the purpose of initiating a closing operation by force of gravity. It will be noted here that a vertical line 86 drawn through the axis of rotation of wheel 76, while the hatch cover is in the open position, will fall outside of or, as shown in FIGURE 8, to the left of the surface of panel 20. Thus when a closing operation is initiated, roller 76 will tend to pull panel 20 outwardly and upwardly and thus help to prevent jamming together of the panels.

When the closing operation is well underway, rollers 40, whose construction has been previously described, will assume the anti-friction purpose of rollers 76. As this happens, plate 70 together with rollers 76 will fall away by rotating about an axis through pin 74. At the same time, slot 72 is of such longitudinal dimension as to allow plate member 70 a slight forward motion thereby breaking the contact point of portions 80 and 82. Finally, when the closing operation is completed, plates 70 fall to rest upon projections 88 and thus will be completely contained within the deck when the hatch covers are closed.

FIGURES 10, 11 and 12 illustrate another embodiment of the "king" beam arrangement described above and shown in FIGURES 1, 6 and 7. In this instance, stiffening plates 25 are cut away at 90, as shown in FIGURES 10 and 12, to accommodate extended portions 92 of plate 28. Portions 92 are hingedly secured to ears 30 by pins 32 as described above. A supporting guide 94 composed of trapezoidal plates 96 and 97, welded to panel 21, and rectangular plate 98 secured to plates 96 and 97, coacts with a roller 100 rotatably mounted at the base of king beam 26 by ears 102 and pin 104. This arrangement is especially useful for heavy hatch cover sections where more leverage is needed in lowering said sections to the closed position. The extension of plates 92 into panels 20 and 21 will cause a gravity controlled closing operation to initiate more easily due to a shift in the center of gravity of the outer panel 20 towards the center of the hatchway.

FIGURE 13 illustrates the use of four panels in a hatch cover section rather than two, as previously described. This arrangement is particularly useful when the vertical distance between two decks is so small as to prohibit the use of only two panels. It is also useful when a large hatch opening is desirable in the lower decks of a vessel. Each section is composed of a pair of hatch covers, designated by 106 and 108, each hatch cover having two panels 110 and 112. Covers 106 and 108 are constructed as previously described. The adjacent panels of each cover are hingedly secured together by hinge means 114 comprising a plurality of protruding ears 116 and 117 secured together by pin 118. Obviously, the panels may be constructed for use with bar 52 or inclines 84 and the anti-jamming means shown in FIGURES 8 and 9 and described above.

While the above description serves as specific, concrete embodiments of the invention, I am not to be limited to the exact construction provided therein except for the scope of the appended claims.

I claim:

1. In a vessel having a hatchway, a pair of folding hatch covers hingedly mounted to opposite ends of said hatchway, each of said covers including an inner and outer panel movable into substantially vertical position when fully open and substantially horizontal position when fully closed, said inner and outer panel each hingedly mounted to a transverse beam generally T-configuration and having flat plate projections mounted along the stem of said T so adapted as to provide structural support for the contacting edges of said inner and outer panel when in the closed position, anti-translational movement means provided in close proximity to and interacting with said transverse beam during an opening or closing operation, a pair of anti-friction means mounted in opposite outer ends of said outer panel coacting with a pair of trackways correspondingly mounted in open opposite sides of said hatchway, each of said trackways being inclined toward the outer extremities thereof, a bar member pivotly mounted to said inner panel, each of said outer extremities being slotted to slidably receive said bar member, said bar member serving as a trackway for said anti-friction means in the initial stage of a closing operation, said anti-friction means including a freely rotating wheel mounted in the underside of one of said outer ends and a second freely rotating wheel mounted within an arm like member pivotly and slidably mounted near the upper portion of said one of said outer ends, said first wheel acting during the initial portion of an opening operation, said second wheel acting during the initial portion of a closing operation, said second wheel and said arm like members adapted to be enclosed within a horizontal plane of said outer panel when in the closed position, and lift means for opening and closing said hatch covers.

2. In a vessel having a hatchway, a pair of folding hatch covers hingedly mounted on opposite ends of said hatchway, each including inner and outer panels movable into substantially vertical position when fully open and substantially horizontal position when fully closed, roller means mounted in opposite outer ends of each of said outer panels, a pair of longitudinal members mounted in said hatchway to serve as tracks for said roller means, each of said pair of longitudinal members being upwardly and outwardly inclined at the outer extremities thereof, said inclines being adapted to allow said roller means to rest thereon in the open position, each of said roller means comprising a generally flat plate like member, slightly U-shaped and bifurcated at one end to receive a freely rotating wheel, the other end being vertically rotatably secured to said outer panel, said one end having an inner face coacting with the end of said outer panel when in the open position, thereby allowing the axis of rotation of said wheel to be substantially without the plane of said outer panel when in the open position to prevent jamming of said inner and said outer panels when a closing operation is initiated, and lift means for opening and closing said hatch covers.

3. A structure as in claim 2 wherein each of said inner and outer panels are hingedly secured to a transverse beam of substantially T-configuration in cross-section, and support means for said structural beam mounted on the underside of each of said inner panels to prevent translational movement between said panels when in opening or closing operation.

4. In a vessel having a hatchway, a pair of folding hatch covers hingedly mounted on opposite sides of said hatchway, each including an inner and outer panel movable into substantially vertical position when fully open, anti-friction means mounted in opposite outer ends of each of said outer panels, a pair of longitudinal members mounted in said hatchway and adapted to serve as trackways for said anti-friction means, said longitudinal members being inclined upwardly and outwardly at the outer extremities thereof and slotted to slidably receive bar members pivotly mounted near inner opposite ends of each of said inner panels, said anti-friction means resting upon said bar members in the open position, and lift means for raising and lowering said hatch covers.

5. A structure as in claim 4 wherein each of said inner and outer members are hingedly mounted to a transverse beam of generally T-cross section and having projections mounted on opposite sides of the stem of said T so as to provide structural support to transverse edges of each said inner and outer panels.

6. A structure as in claim 4 wherein said anti-friction means consist of a pair of rollers mounted in opposite outer-ends of each of said outer panels, one of said pair of rollers being rotatably secured within the lower portion of said outer end, the other of said pair of rollers being rotatably mounted in one arm of a generally U-shaped plate member, the other arm of said plate member slidably, pivotly mounted near the upper portion of said outer end, said pair of rollers being arranged so that the first of said pair assumes its function during the latter part of a closing operation and the second mentioned of said pair assumes its function during the latter part of an opening operation.

7. In a vessel having a hatchway, a pair of folding hatch covers hingedly mounted on opposite sides of said hatchway, each including inner and outer members movable into substantially vertical position when fully open and substantially horizontal position when fully closed, hinge means between each of said inner and outer members consisting of a transverse beam pivotly mounted on each of said members, bearing means depending from the under surface of each of said inner members, said bearing means adapted to contact the base of said transverse beam in an opening or closing operation thereby preventing translational movement between said members, a pair of longitudinal ledges mounted in said hatchway supporting the longitudinal edges of said pair of hatch covers when fully closed, and lift means secured solely to said panels for opening and closing said hatch covers.

8. A structure as in claim 7 wherein said inner and outer members consist of top plate portions supported by transverse beams so arranged as to intermesh when said hatch cover is in the vertical position, said pivotly mounted transverse structural beam of substantially T-configuration in cross section with at least two pairs of plates mounted thereto for pivotal connection with depending ears from said inner and outer members, the axes of rotation for said pivotal connection being in a plane beneath the plane of said top plate of each of said members when in closed, horizontal position.

9. A structure as in claim 7 wherein said transverse beam contacts and provides structural support for each of said members when in the closed, horizontal position.

10. A structure as in claim 7 wherein said transverse beam is provided with anti-friction means mounted on the longitudinal base thereof, said anti-friction means arranged for contact with said bearing means in the initial stage of a closing operation.

References Cited by the Examiner
UNITED STATES PATENTS

| 1,455,513 | 5/23 | Von Tell | 114—201 |
| 2,484,286 | 10/49 | Groppell | 114—201 |
| 2,655,889 | 10/53 | Jernstrom | 114—202 |
| 3,050,026 | 8/62 | Ligh | 114—202 |

FOREIGN PATENTS 903,313 2/54 Germany.

References Cited by the Applicant
UNITED STATES PATENTS

| 2,707,928 | 5/55 | Farrell. |
| 2,753,828 | 7/56 | Mege. |
| 2,917,017 | 12/59 | Stransky. |

MILTON BUCHLER, *Primary Examiner.*

ANDREW H. FARRELL, *Examiner.*